United States Patent [19]
Vesel

[11] 4,249,920
[45] Feb. 10, 1981

[54] SCRUBBER AND METHOD UTILIZING WETTED SLOTTED SCREENS FOR REMOVING FLYASH FROM FLUE GAS

[75] Inventor: Lawrence M. Vesel, Conroe, Tex.

[73] Assignee: UOP Inc., Des Plaines, Ill.

[21] Appl. No.: 93,462

[22] Filed: Nov. 13, 1979

[51] Int. Cl.³ .............................................. B01D 47/06
[52] U.S. Cl. ....................................... 55/233; 55/220; 55/418; 261/111
[58] Field of Search ................. 55/220, 233, 240, 520, 55/418; 261/111

[56] References Cited
U.S. PATENT DOCUMENTS

| 3,375,058 | 3/1968 | Petersen et al. | 55/257 R X |
| 3,599,398 | 8/1971 | Jaeger | 55/520 UX |

FOREIGN PATENT DOCUMENTS 317955  1/1920  Fed. Rep. of Germany ............. 55/240

*Primary Examiner*—Kathleen J. Prunner
*Attorney, Agent, or Firm*—James R. Hoatson, Jr.; Barry L. Clark; William H. Page, II

[57] ABSTRACT

Improved scrubber and method for removing particulate matter from hot flue gases, particularly flyash in a sludge incinerator, utilizes a plurality of cylindrical slotted wire screen canisters which are preferably mounted vertically in apertures in a plate in a chamber in which the hot gas moves vertically. The bottoms of the canisters may be closed so that the vertically moving gases will change direction at least twice as they move sideways through the screen slots and then vertically again inside the screens, or alternatively, the bottoms can be screens also with a baffle plate positioned under them to cause a change of direction of the gases. A spray nozzle in each canister keeps the spaced wires forming the sides and the slots wet so that a majority of the flyash will be captured and washed down the sides of the canisters while additional particles will be captured by the water wash spray inside the canisters. The system is very efficient in particulate collection, uses relatively little water, has a very small pressure drop and is quite inexpensive to build since the scrubbing tower can be of a minimal height. The system can also be retrofitted to existing scrubbers to improve their performance and lower their operating costs.

9 Claims, 3 Drawing Figures

U.S. Patent
Feb. 10, 1981
4,249,920
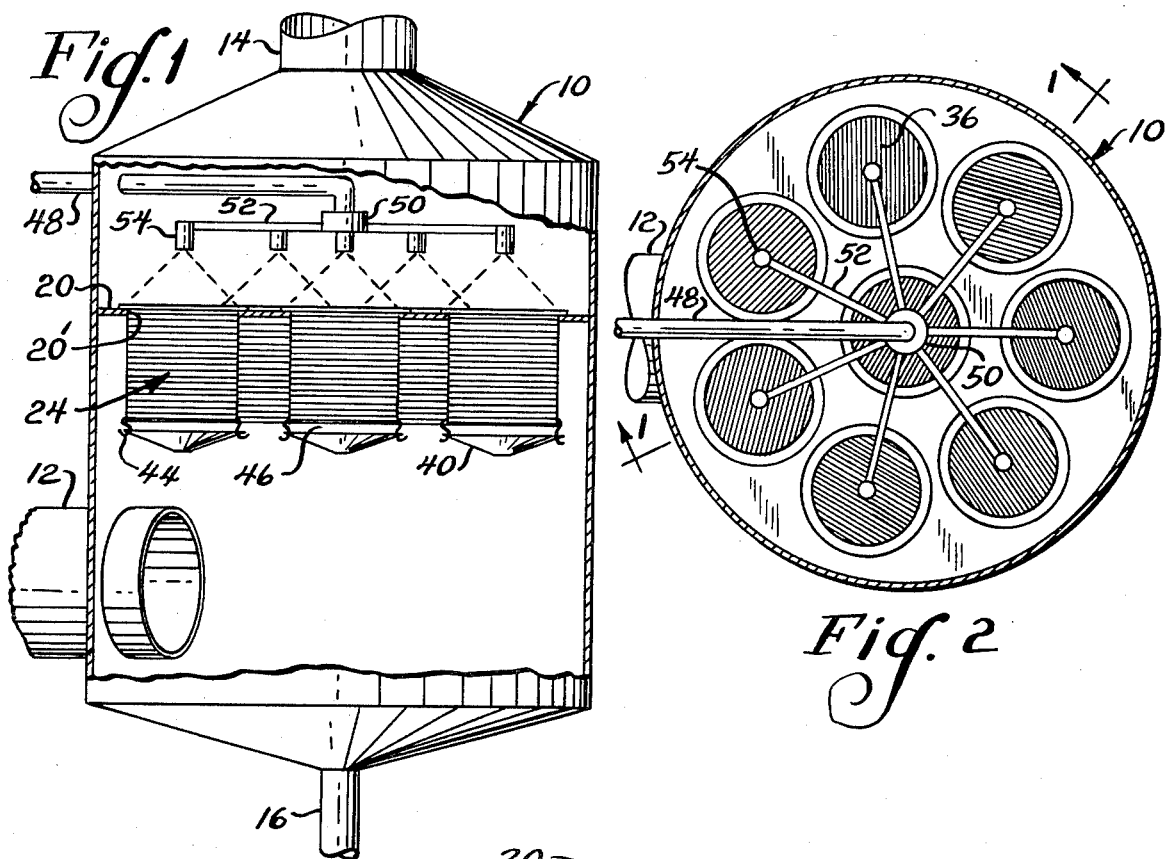
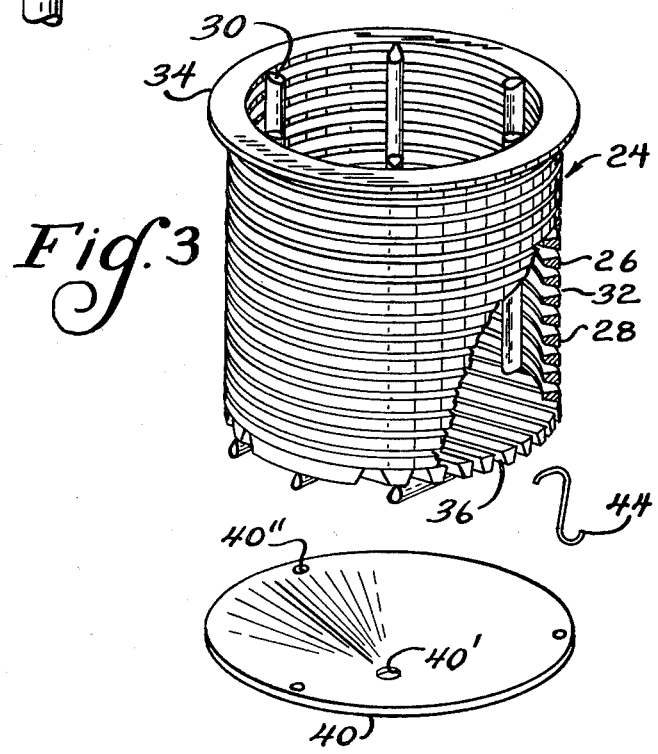

SCRUBBER AND METHOD UTILIZING WETTED SLOTTED SCREENS FOR REMOVING FLYASH FROM FLUE GAS

BACKGROUND OF THE INVENTION

The invention relates to the field of particulate removal from gases and particularly to scrubbers of the type which wet the particles and carry them away in a flow of water. One example of a type of scrubber which is widely used for collecting the flyash from municipal sludge incinerators is a venturi scrubber which uses a scrubbing tank or tower approximately 34 feet high and 8 feet in diameter containing 12 spray nozzles which spray the gas with a total of about 100–120 gpm of water. A 647 rpm fan sucks the flue gas through the scrubber tower at about 25,000 CFM and utilizes about 30 BHP to move the gas and overcome a pressure drop of about 2.8–3.0 inches of water in the tower. The pressure drop is introduced mainly by the fact that the inlet gas is channeled through a narrow restriction of about 0.69 square feet at the end of a square inlet pipe having a cross-sectional area of 7.56 square feet. The restriction increases the gas velocity and causes it to swirl upwardly around the side walls of the tower which are constantly sprayed with a high pressure spray of water. Collisions of the water droplets with the flyash particles wet the particles and cause them to move outwardly against the wall by centrifugal force and then drop along the water washed walls to a drain where they are carried away and usually mixed in with the sludge being burned. The large volumes of water required entail a significant cost in their own right in addition to enhancing corrosion conditions at the suction fan. Although it is known that particles are easier to collect as their velocity decreases, the venturi scrubber must greatly increase their velocity to cause them to concentrate near the wetted tower walls. Electrostatic precipitators are not a feasible alternative due to their cost, and baghouse systems would present too high a pressure drop even if fabrics could be found to handle the heat of the flue gases.

SUMMARY

It is an object of the present invention to provide a wet scrubber and a method of contacting particulate containing gases which will overcome the problems of the prior art venturi scrubbers, and particularly their large pressure drop, their large size and their large use of water. The improved scrubber and method of the present invention has these advantages while also being quite efficient in particulate collection since all of the gas is forced to pass in contact with the water. In a preferred embodiment, a plurality of cylindrical slotted wire screen canisters are mounted on a horizontal tube sheet in the scrubber tank. The screen canisters preferably have their lower ends either closed or formed of a screen which is shielded by a baffle plate and have flanges at their upper ends which engage the surfaces of the tube sheet surrounding the apertures through which the canisters hang. The screens are preferably of the type shown in E. E. Johnson U.S. Pat. No. 2,046,458 wherein a formed wire is helically wrapped around a plurality of support rods to which it is welded at every intersection.

In one actual use of the invention, nine 2 foot diameter by 2 foot long screen canisters were mounted in nine apertures in an 8 foot diameter tube sheet positioned in the tower of an existing venturi type scrubber. In this situation, the slot forming wire was 0.060" wide by 0.124" deep and was welded to 0.156" wide, teardrop shaped rods so as to form a continuous, helical slot having a width of 0.030". The resulting open area in the screens was about 37 square feet as compared to the approximately 7.56 square foot area of the inlet pipe to the scrubber tank which had its restrictive orifice removed. A spray nozzle positioned about one foot above the center of each canister sprays a conical pattern of water against the sides of the screen which wets the wires and flows down over them to carry captured particulate matter downwardly where it can be carried through the lowest slot and fall over the edges of the lower end plate into a drain at the bottom of the tank. The nozzles used were Spraco part number 11-9221-11 which produce a 93° spray angle and are rated at 10.2 gpm at 80 psi water pressure. The very large open area of the screen slots compared to the area of the inlet pipe causes a considerable reduction in velocity of the gases and enhances the ease with which they may be wetted and collected. Furthermore, the closed bottoms of the array of spaced canisters cause much of the gas flow to change its flow direction to enter the space between the canisters and then, because of the substantial horizontal depth of the slot forming wires, all of the gas must make almost a 90° turn to pass through the slots and into the interior of the canisters. These direction changes further reduce the velocity of the particulate matter and additionally enhance its ability to be wetted and collected by the wet screen wires. As the gas stream changes direction inside the screens and heads for their open upper ends, it is further contacted by the particles of spray through which it must pass.

In the aforementioned actual use, the total water usage in the nine spray nozzles was cut from about 120–150 gpm commonly used by a venturi scrubber to about 86 gpm using city water pressure of about 60 psi. The pressure drop through the tower was reduced from about 4.5 inches of water common with a venturi scrubber to 0.5–1.0 inches of water.

Where an even greater percentage of particulates must be removed, a second set of canisters can be installed upside down above the first set. These upper canisters, which would also be internally wetted with a spray nozzle, cause another direction change for the gases and can be made with smaller size openings to increase the percentage of remaining particulate which is contacted. Efficiency can possibly be further improved by various means such as channelizing the flow of effluent at the bottom of the lower canister and causing it to move to the drain via a wire or pipe, for example, to minimize re-entrainment of the collected particles. Additional improvement might be expected by optimizing the wire shape, the slot width, the spray pattern, and the droplet size in accordance with anticipated operating conditions.

BRIEF DESCRIPTION OF THE DRAWINGS

FIG. 1 is a side view of a scrubber tank incorporating my invention;

FIG. 2 is a top view taken on line 2—2 of FIG. 1; and

FIG. 3 is an isometric view of a screen canister which is partially broken away and sectioned for clarity.

DESCRIPTION OF THE PREFERRED EMBODIMENT

In FIG. 1, a scrubber chamber indicated generally at 10 is shown as having a particulate containing flue gas inlet pipe 12 entering into its side near its bottom. At the top of the chamber 10 a gas outlet pipe 14 is provided for discharging the scrubbed flue gas to a stack or to the atmosphere. The lowest portion of the chamber 10 has a drain pipe 16 attached to it so that the water utilized in the scrubbing process and the particulate matter captured therein can be removed from the chamber. Positioned transversely of the chamber 10 is a mounting plate or tube sheet 20 having a plurality of apertures 20' therein for accommodating a like number of canister assemblies 24.

The canister assembly 24 is illustrated more clearly in FIG. 3 and comprises a cylindrical body 26 which is preferably formed by helically wrapping a profiled surface wire 28 about a plurality of rod members 30. The surface forming wire 28 is preferably welded at each of its junctions with the rods 30 so as to define a plurality of equally spaced, generally horizontal slots 32 through which the gases to be purified are passed. The screen body 26 can be formed in a conventional manner such as that disclosed in E. E. Johnson U.S. Pat. No. 2,046,457. The screen body 26 is preferably welded to an annular support flange 34 which permits the canister assemblies 24 to be dropped through the apertures 20' and retained by contact of the flange 34 with the mounting plate 20. The assembly 24 is shown as being formed on its bottom with a flat screen portion 36. The flat screen portion 36 can be prepared by winding a cylindrical screen, cutting the cylinder along a line parallel to its axis and then flattening it to form a flat screen surface which can then be cut to the desired shape. Positioned directly under the bottom screen 36 is a dish-shaped baffle plate 40 which preferably has a diameter slightly greater than the diameter of the screen body 26. The baffle plate 40 is shown as having a drain or aperture 40' in its center and at least three small apertures 40" around its periphery. The small apertures are engaged by hook members 44 which pass through them and also through slot openings in the bottom of the screen body 26 to suspend the baffle plate a slight distance below the screen body. The drain hole 40' is preferably made of as small a diameter as possible to accommodate all of the water and collected particulate which drains from the screen body 26 and through the bottom screen 36. By keeping the hole 40' and the resulting stream of effluent of relatively small diameter there will be very little opportunity for the particulate matter in the stream to be re-entrained in the hot flue gas through which the stream is falling. By having the baffle plate 40 have a slightly larger diameter than the screen canister 26, the liquid and collected particles dripping down around the bottom edge of the screen body 26 is more likely to fall into the baffle plate 40 rather than be re-entrained by the flue gases. The presence of the baffle plate 40 ensures that any gases which do pass through the space between the baffle plate and the bottom screen 36 will undergo a substantial change in direction before entering the inside of the screen body 26 and thus will tend to lower the velocity of the gases and facilitate the removal and collection of the particulate matter therein. If desired, the bottom screen 36 could be replaced with a continuous plate with the result that the water and collected particulate matter inside the screen would have to exit through the lowest slot 32. Such a construction, with or without a baffle plate 40, would still allow the upwardly flowing gases to change direction as they pass through the screen slots 32 but would present a greater opportunity for slot blockage over time than would the arrangement shown in the drawings wherein a slotted bottom screen 36 is used. Where a screen body 26 having a diameter of approximately two feet is utilized, a sizing of the hooks 44 to provide for the space 46 to be approximately one inch should be satisfactory. Likewise, an extension of the baffle plate 40 about one inch beyond the screen body should be satisfactory as should a baffle plate cone angle of about 20° relative to the horizontal as is shown in FIG. 1.

The water used for the scrubbing process enters the scrubber chamber 10 through a water inlet pipe 48 which is connected to a distributor fitting 50. A plurality of spray head support pipes 52 connect the distributor fitting 50 to a plurality of spray heads 54 which preferably overlie the array of canister assemblies 24 and are positioned on the axes thereof so that each spray will cover the entire inner wall of its associated screen body 26 near the top thereof and flow downwardly over the surface wire 28 so as to wet the same. The spray from the spray heads 54 should also constantly traverse the upper ends of the screen bodies so that any particulate matter which escapes being collected in the water flowing over the wire surfaces as the flue gas passes through the slots 32 or the slots in the bottom surface 36 will be forced into contact with the water spray before it exits the scrubber chamber.

I claim as my invention:

1. In a scrubber for removing flyash or other particulate matter from a stream of gas, the improvement comprising a chamber having a particulate containing gas inlet in the area of its bottom and an outlet for clean gas near its top, a mounting plate mounted generally horizontally in said chamber; said mounting plate having a plurality of apertures therein, each of said apertures having mounted therein a generally cylindrical canister having its side walls being defined by circumferentially arranged wraps of wire which are integrally attached to a plurality of vertically positioned rod members so as to define a series of vertically arranged, generally horizontal slots; a spray nozzle positioned axially relative to each of said canisters for directing a spray pattern of liquid outwardly against said wires, said liquid serving to wet substantially all of said wire wraps as it flows downwardly so that the substantial portion of the particulate matter in the gas passing over them will be captured in the liquid and will be washed down the wire walls of the canisters, said canisters being spaced so that substantially all of the upwardly flowing gases will have to pass into the vertical space betweem them and then change direction to enter and leave the slots in said canisters, thereby reducing the velocity of the particulate matter and increasing the efficiency of its collection, said gases also passing through said spray while moving upwardly through said canisters.

2. The scrubber of claim 1 wherein said wraps of wire comprise a single length of helically coiled wire.

3. The scrubber of claim 1 wherein a baffle plate is suspended under said cylindrical canister, said baffle plate serving to deflect upwardly moving gas around the sides of said canister.

4. The scrubber of claim 3 wherein said cylindrical canister has its bottom covered by a slotted screen.

5. The scrubber of claim 4 wherein said baffle plate has a dish-like shape with an aperture in its center for permitting water falling on said plate from the canisters to fall downwardly through the portion of the chamber positioned below the plate in a stream.

6. The scrubber of claim 5 wherein said baffle plate extends radially outwardly of said canister.

7. The scrubber of claim 6 wherein said baffle plate extends at least about 0.5" radially outwardly of said canister and has its upper, outer edge suspended no more than about 1" below the canister.

8. The scrubber of claim 1 wherein said wraps of wire have a radial dimension of at least 0.1" and a vertical dimension no greater than 65% of their radial dimension.

9. The scrubber of claim 8 wherein said wraps of wire have a profile such that the slots formed thereby are tapered so as to have their minimum width on their inlet side.

* * * * *